(12) United States Patent
Georgiev et al.

(10) Patent No.: US 7,657,119 B1
(45) Date of Patent: *Feb. 2, 2010

(54) DIFFERENTIAL IMAGE ADJUSTMENTS

(75) Inventors: Todor G. Georgiev, Sunnyvale, CA (US); Jen-Chan Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/779,172

(22) Filed: Jul. 17, 2007

Related U.S. Application Data

(63) Continuation of application No. 10/407,651, filed on Apr. 3, 2003, now Pat. No. 7,248,745.

(51) Int. Cl.
*G06K 9/64* (2006.01)

(52) U.S. Cl. .................... 382/278; 382/209; 382/219

(58) Field of Classification Search ............... 382/255, 382/260, 274, 275; 358/3.27, 463
See application file for complete search history.

(56) References Cited

U.S. PATENT DOCUMENTS

| | | | |
|---|---|---|---|
| 5,671,395 A * | 9/1997 | Akiyama ................. 716/20 |
| 5,712,474 A | 1/1998 | Naneda |
| 5,790,692 A * | 8/1998 | Price et al. ............... 382/133 |
| 5,846,189 A * | 12/1998 | Pincus .................... 600/301 |
| 5,880,977 A * | 3/1999 | Syo ........................ 716/20 |
| 5,991,456 A | 11/1999 | Rahman et al. |
| 5,995,912 A * | 11/1999 | DeWolf et al. ........... 702/85 |
| 6,057,935 A | 5/2000 | Freeman |
| 6,196,715 B1 | 3/2001 | Nambu et al. |
| 6,236,750 B1 * | 5/2001 | Garber .................... 382/162 |
| 6,275,600 B1 | 8/2001 | Banker et al. |
| 6,512,845 B1 | 1/2003 | Haikin et al. |
| 6,628,842 B1 * | 9/2003 | Nagao ..................... 382/266 |
| 6,744,544 B1 | 6/2004 | Nagashima et al. |
| 6,788,340 B1 * | 9/2004 | Chen et al. ............... 348/229.1 |
| 6,847,738 B1 * | 1/2005 | Scognamiglio et al. ..... 382/260 |
| 6,870,575 B2 * | 3/2005 | Hibi et al. ................ 348/625 |
| 6,912,071 B1 | 6/2005 | Rasmussen et al. |
| 6,990,249 B2 * | 1/2006 | Nomura ................... 382/254 |
| 7,006,079 B2 * | 2/2006 | Kidode et al. ............ 345/173 |
| 7,072,503 B2 * | 7/2006 | Prince ..................... 382/150 |
| 7,072,524 B1 | 7/2006 | Yamada |
| 7,102,638 B2 * | 9/2006 | Raskar et al. ............. 345/428 |

(Continued)

OTHER PUBLICATIONS

Z. Rahman, D. Jobson and G. Woodell; "A Multiscale Retinex For Color Rendition and Dynamic Range Compression," College of William & Mary, Williamsburg, VA.

(Continued)

*Primary Examiner*—Yosef Kassa
(74) *Attorney, Agent, or Firm*—Fish & Richardson P.C.

(57) ABSTRACT

Methods and apparatus implementing systems and techniques for adjusting images. In general, in one implementation, the technique includes: receiving input defining an adjustment to be applied to a differential representation of a source image, calculating the differential representation of the source image, producing a structural representation of the source image, the structural representation corresponding to multiple types of contrast in the source image, modifying the differential representation based on the structural representation and the input defining the adjustment, and generating a modified image from the modified differential representation by solving a Poisson differential equation.

23 Claims, 3 Drawing Sheets

U.S. PATENT DOCUMENTS 7,149,344 B2 * 12/2006 Prince .................... 382/150
7,177,481 B2 *  2/2007 Kaji ...................... 382/265

OTHER PUBLICATIONS

R. Fattal, D. Lischinski and M. Werman; "Greadient Domain High Dynamic Range Compression," Jul. 2002, School of Computer Science and Engineering, The Hebrew University of Jerusalem.

B. Horn; "Determining Lightness from an Image," Jun. 1974, Massachusetts Institute of Technology, Cambridge, Massachusetts.

B. Horn; "On Lightness," Oct. 1973, Massachusetts Massachusetts Institute of Technology, Cambridge, Massachusetts.

L. Yu and C. Dyer; "Direct Computation of Differential Invariants of Image Contours from Shading," University of Wisconson, Madison, Wisconsin.

"Land's Retinex theory," Website: http://kybele.psych.cornell,edu/.

* cited by examiner

210 —

| -1 | 0 | 1 |
|---|---|---|
| -2 | 0 | 2 |
| -1 | 0 | 1 |

Kernel
Divisor = 8

220

| -1 | -2 | -1 |
|---|---|---|
| 0 | 0 | 0 |
| 1 | 2 | 1 |

Kernel
Divisor = 8

230 —

| 0 | 1 | 0 |
|---|---|---|
| 1 | -4 | 1 |
| 0 | 1 | 0 |

Kernel
Divisor = 4

| 0 | 1 | 0 |
|---|---|---|
| 1 | 0 | 1 |
| 0 | 1 | 0 |

Kernel
Divisor = 4

320

| 0 | 0 | -1 | 0 | 0 |
|---|---|---|---|---|
| 0 | -2 | 8 | -2 | 4 |
| -1 | 8 | 12 | 8 | -1 |
| 0 | -2 | 8 | -2 | 0 |
| 0 | 0 | -1 | 0 | 0 |

Kernel
Divisor = 32

FIG. 3

DIFFERENTIAL IMAGE ADJUSTMENTS

This application is a continuation of and claims priority to U.S. application Ser. No. 10/407,651, filed on Apr. 3, 2003. The disclosure of the prior application is considered part of (and is incorporated by reference in) the disclosure of this application.

BACKGROUND OF THE INVENTION

The present application describes systems and techniques relating to image modification, for example, modifying a digital image to improve display qualities or to obtain creative effects.

One conventional technique for modifying images involves using an image adjustment interface to modify image data on a pixel-by-pixel basis, such as to change image brightness, contrast, color, and so on. The PHOTOSHOP® image editing software, provided by Adobe Systems Incorporated of San Jose, Calif., offers such user interfaces (e.g., curves, levels, sliders), which can be used to define a mapping from a first set of pixel values to a second set of pixel values. When the mapping is applied to an image, the appearance of the image is changed accordingly.

Traditional techniques for modifying images also include image enhancement techniques used to address recurring visual anomalies, such as by obtaining dynamic range compression. Land's retinex theory has been used in a number of image enhancement techniques that apply a defined modification to an image to address dynamic range and color constancy issues. Other defined techniques for adjusting shadow and highlight detail in images are also available. For example, one technique can assist in removing shadows from images and involves duplicating, blurring and inverting an image, followed by combining the image with the original image in Color Dodge mode in PHOTOSHOP® software. Although the sequence of steps in this technique may be considered relatively strange, they can produce useful results in adjusting shadow and highlight detail in images.

SUMMARY OF THE INVENTION

The present disclosure includes systems and techniques relating to adjusting images. In one aspect, a technique includes receiving input defining an adjustment to be applied to a differential representation of a source image, calculating the differential representation of the source image, producing a structural representation of the source image, the structural representation corresponding to multiple types of contrast in the source image, modifying the differential representation based on the structural representation and the input defining the adjustment, and generating a modified image from the modified differential representation by solving a Poisson differential equation. The technique can further include generating the source image by preprocessing an original image.

Producing the structural representation can be done based on color contrast, noise variation, and luminance variation in the source image. Producing the structural representation based on the luminance variation in the source image can involve performing multiple blur operations, which can involve using one or more kernels based on one or more user-defined parameters. Producing the structural representation based on the color contrast can involve using contrast information derived from the source image using a structure tensor. Producing the structural representation based on the noise variation can involve using standard deviation information derived from the source image. And producing the structural representation can involve building a mask capturing results of operations that generate the color contrast, the noise variation, and the luminance variation from the source image.

Calculating the differential representation can involve calculating image gradients to produce a multi-channel differential representation. Calculating the differential representation can also involve calculating a laplacian of the source image. Calculating the differential representation can involve calculating at least a second order differential representation of the source image. Generating the modified image from the modified differential representation can involve iteratively applying one or more kernels to generate a solution to the Poisson differential equation corresponding to the differential representation of the source image. Receiving the input can involve receiving input from a curves adjustment user interface.

In another aspect, a technique includes calculating a differential representation of a source image, the differential representation being of a type selected from a group consisting of gradient, laplacian, gradient of the laplacian, and second laplacian, modifying the differential representation based on user input to an image editing application and based on a source-image structural representation that includes color contrast, noise variation, and luminance variation information for the source image, and generating a modified image from the modified differential representation by solving a Poisson differential equation having a form selected from a group consisting of $\Delta f = \nabla \cdot s$, $\Delta f = s$, $\Delta \Delta f = \nabla \cdot s$, and $\Delta \Delta f = s$, where s corresponds to the modified differential representation. Modifying the differential representation can involve multiplying the differential representation by a mask that consolidates the user input and the source-image structural representation.

Implementations of the systems and techniques described here may occur in hardware, firmware, software or a combination of both, and may include instructions for causing a machine to perform the operations described. The invention can be implemented to realize one or more of the following advantages. A user can be provided extensive freedom in defining the differential adjustments to be applied, thus providing the freedom to use the techniques for creative image effects and/or to enhance images to address one or more different image anomalies. An image can be adjusted to remove shadows and/or to make dark areas appear normal in relation to bright areas without washing out intermediate areas or otherwise rendering them unnatural looking.

The nature of the image adjustment is differential but is not fixed to any particular type of adjustment or purpose. Adjusting an image by modifying a differential representation of the image allows powerful image modifications with a simple user interface. Taking human-perceivable contrast in the source image into account during modification can result in a better final image. When generating a modified image from the modified differential representation, solving the corresponding partial differential equation provides more control over the final adjusted image because there is a defined relationship between a particular effect and a particular manipulation of the corresponding derivatives.

The details of one or more embodiments of the invention are set forth in the accompanying drawings and the descrip-

BRIEF DESCRIPTION OF THE DRAWINGS

FIG. 2 illustrates example kernels for use in adjusting an image.

FIG. 3 illustrates example kernels for use in solving a differential equation.

Like reference symbols in the various drawings indicate like elements.

DETAILED DESCRIPTION

Figure 1:
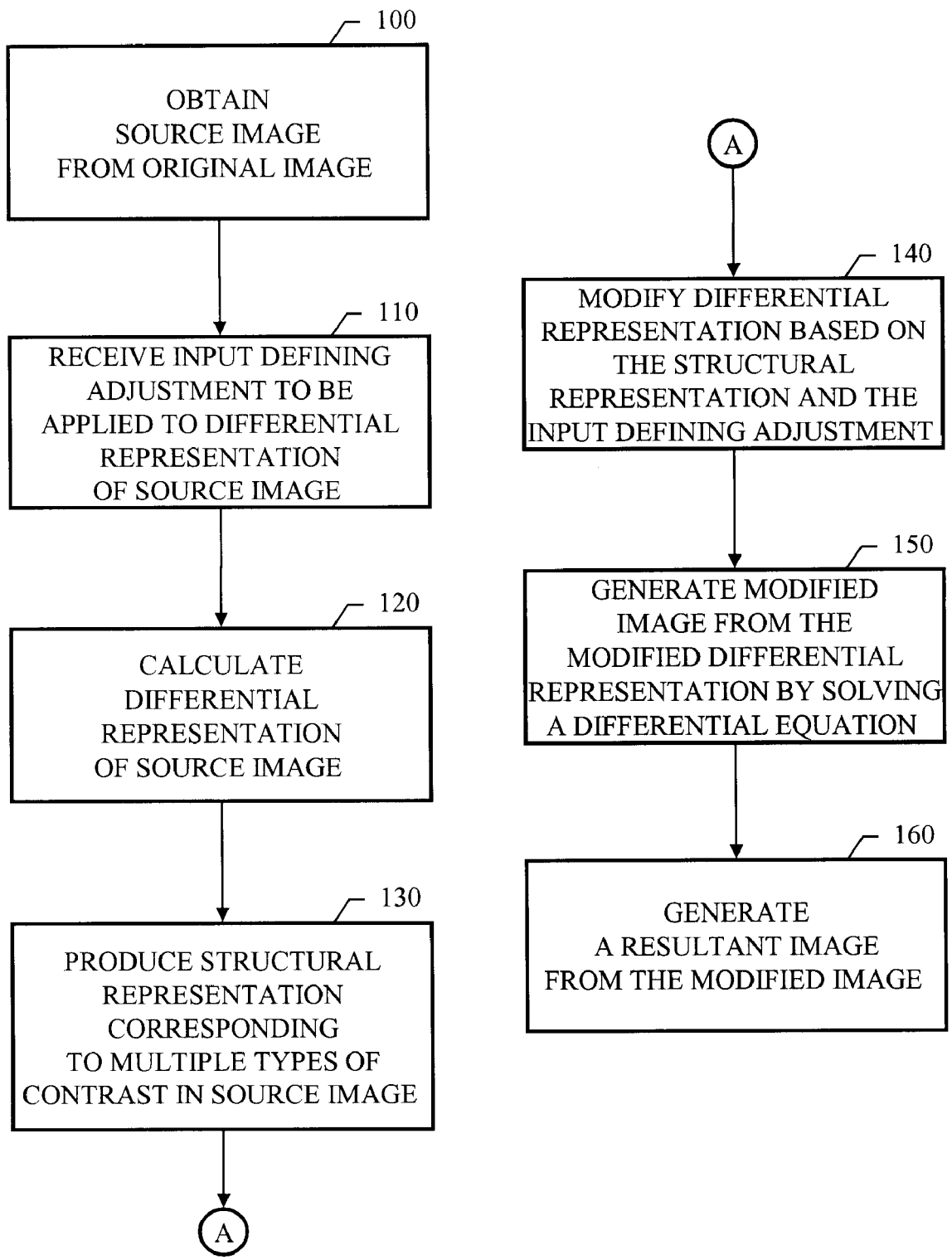
FIG. 1 is a flow chart illustrating an example process of adjusting an image.

FIG. 1 is a flow chart illustrating an example process of adjusting an image. The process can begin by obtaining a source image from an original image at 100. The source image can be a region of the original image and/or the source image can be derived from the original image. The source image can be a portion of a digital image that can include the whole image, a rectangular region within the image, an arbitrarily shaped connected region within the image, or an arbitrarily shaped unconnected region within the image, such as a region specified by a user.

The source image can be derived from the original image, such as by generating the source image from the original image. The original image can be a received image, such as image data loaded from a storage device or received over a network or received from an image generating system/device (e.g., a camera or scanner). The source image can be generated from one or more channels of the original image. The source image can be generated by taking a logarithm of the original image or a portion of the original image. For example, the source image can be the logarithm of each color channel of the original image or the logarithm of the luminance of the original image (e.g., the luminance can be processed using the techniques described, after which the chromaticity of the original image can be added back in to obtain the final result).

Input defining an adjustment is received at 110. The input can be received from numerous alternative locations and interfaces. The input can be received from a user of an image editing application, such as Photoshop® software. For example, the input can be received from a curves adjustment interface. The input can be received from an image generating system/device (e.g., a camera or scanner). For example, the input can be received from a device interface providing a defined range of adjustments.

In general, the adjustment defined by the input corresponds to an adjustment to be applied to a differential representation of the source image. A user can specify the extent and nature of the adjustment, including by specifying the type of differential representation to be adjusted. A differential representation of the source image is calculated at 120. The differential representation can be a first order differential representation or a higher-order differential representation of a source image f For example, the differential representation can be gradient values ($\nabla f$), laplacian values ($\Delta f$), gradient of the laplacian ($\Delta \nabla f$), or second laplacian ($\Delta \Delta f$) calculated from the source image. The various differential representations capture changes among pixels of different differential orders, and the user can specify which differential order to use and how to modify the source image in the specified color space.

A structural representation of the source image is produced at 130. The structural representation corresponds to multiple types of contrast in the source image. Images tend to have noise, or texture detail, which creates big but insignificant local gradients and/or other derivatives. Humans with normal color vision can automatically discount these localized changes in observed images because they do not contribute to the general flow or structure of the image. For example, close to an object edge, there may be many small details, having derivatives that are relatively big, but the edge itself is more important than the noise along the edge. Such higher level edge information tends to be preserved in a blurred version of the image.

The produced structural representation can take into account several types of contrast information, such as perceivable color contrast, noise variation, and a higher level measure of edge-ness in the source image. Including the measure of edge-ness in the structural representation can involve performing multiple blur operations on the source image and then applying an edge detector. This can be done using one or more kernels, which can be based on one or more user-defined parameters, as discussed further below.

Taking into account perceivable color contrast can involve producing a component of the structural representation based on color contrast information derived from the source image using the structure tensor. Taking into account noise variation can involve producing a component of the structural representation based on standard deviation information derived from the source image. Moreover, producing the structural representation can involve building a mask capturing results of operations that generate the perceivable color contrast, the noise variation, and the measure of edge-ness from the source image, such as described below. The mask can be used in remapping the source image based on the received input.

The differential representation of the source image is modified based on the structural representation and the input defining the adjustment at 140. The differential representation can be modified at each point based on a mask, such as described above; combining three measures (i.e., hints) about where the edge is, helps focus adjustment work where it needs to be done: on the edges, and according to the strength of the edges, as opposed to everywhere.

Next, a modified image is generated from the modified differential representation by solving a Poisson differential equation at 150. The type of Poisson equation solved and the technique used depends on the differential representation used and the computing resources available. Generating the modified image can involve iteratively applying one or more kernels to generate a solution to a Poisson equation corresponding to the modified differential representation of the source image. Solving the corresponding partial differential equation provides more control over the final adjusted image because a particular effect is known to be due to a particular manipulation of the corresponding derivatives.

Finally, a resultant image can be generated from the modified image at 160. The resultant image can be an exponent of the modified image, such as when the image processing of the luminance channel in Lab space is done in the logarithm space. Moreover, generating the resultant image can involve rebuilding color information to account for adjustments made based on color contrast. The modified image can represent a modified luminance component of the original image, and color components can be added back in to obtain the resultant image. For example, the modifications can be performed on the L channel in Lab space, and the resultant image can be the combination of the modified L channel and the original ab information, as described below.

Modifying the differential representation of the source image can involve remapping the differential representation using a mask, M(x,y), that consolidates the input defining the adjustment and the structural representation. The mask can be applied to the differential representation, D, to obtain the modified differential representation, s, such as by multiplication:

$$s = MD \quad (1)$$

If the user input defines no adjustment, then the mask provides no adjustment irrespective of the structural representation. For example, the default mask can be identity: M=1.

Building the mask, M, depends in part on the type of differential representation. For a multi-channel differential representation, such as for the gradient vectors g=∇f, the mask can be initially calculated as:

$$M(g) = \text{remap}(\sqrt{g \cdot g}); \quad (2)$$

and for scalars like g=Δf, the mask can be initially calculated as:

$$M(g) = \text{remap}(g); \quad (3)$$

where remap(x) corresponds to the user input defining the adjustment. The user is free to define any mapping using one or more user interfaces (e.g., curves, sliders). By defining the mapping appropriately, the user can boost strong changes or strong edges in an image, dampen weak noise, dampen low curvature, dampen high curvature, increase detail, etc. The mask, M, may be an increasing smooth function normalized to reach maximum of 1.

The mask can take into account perceivable color contrast, which describes how much adjacent colors in an image differ perceptually. The perceivable color contrast is essentially a metric of perceivable color difference (e.g., the same luminance in red and green result in more contrast than red and orange). Perceivable color contrast is based on human color perception and can be captured in color spaces, such as the Lab space. Taking perceivable color contrast into account when generating the mask can improve the image adjustment. For example, a detected edge in an image may be due to lighting conditions instead of change in color/reflectance of the real world object; the color contrast information can be used as evidence of lighting conditions in the image and can thus be used to modify the mask for an improved image adjustment.

Perceivable color contrast generally includes two components, a and b, that describe chromaticity. Between every two points in a chromaticity ab-plane, there is color contrast, CC:

$$CC = \sqrt{\Delta a^2 + \Delta b^2} \quad (4)$$

where Δa and Δb are changes in chromaticity. The complete information can be captured by a structure tensor (2×2 matrix):

$$C = A + B, \quad (5)$$

$$\text{where } A = \begin{pmatrix} a_x a_x & a_x a_y \\ a_y a_x & a_y a_y \end{pmatrix}, B = \begin{pmatrix} b_x b_x & b_x b_y \\ b_y b_x & b_y b_y \end{pmatrix}, a_x = \frac{\partial a}{\partial x},$$

and so on. The quantity used to produce the mask can be the absolute value of the color contrast, which is $$c = \sqrt{\det C},$$

where det is the determinant, representing the perceptual magnitude of color contrast. For example, the values c can be used generate a color contrast version of the source image. This color contrast image can also be normalized to have highest value of 1.

The mask can be modified based on perceivable color contrast. Color contrast is often correlated with reflectance properties, and not with lighting and shadow, which are generally white and gray. Thus, if strong changes in color are correlated with changes in luminance in an image, this is generally not due to lighting. To remove the effects of lighting, the luminance changes that are correlated with color changes should be ignored, because they are not due to lighting. For example, a blur can be applied to a color contrast version of the source image, and the result can be combined with the mask, M, such as by adding the result to the mask, such as by multiplication or division, and thresholding the mask to one, if needed.

Additionally, the mask can be modified based on noise variation, such as a measure of the standard deviation of noise in the source image at a small area around each pixel. The mask can be modified based on the structural representation of the source image. As mentioned previously, images tend to have noise, or texture detail, that creates large but visually insignificant local gradients or other derivatives. Such local gradients tend to cancel each-other on average, and do not contribute to the large scale structure of the image. They describe only local small scale texture or noise. For example, there may be lots of small detail close to an edge in an image, but the edge itself is of interest and not the noise around the edge.

The mask can be modified based on a measure of edge-ness in the source image. Higher pyramidal-level edge information tends to be preserved in a blurred version of an image. Thus, the measure of edge-ness can be captured, with an appropriate edge detector, and put into the mask using a blur operation, such as applying a blur kernel. The blur operation can involve applying multiple kernels, which can be based on one or more user-defined parameters. For example, the one or more kernels can be Gaussian kernels with different radii, which can be specified by a user. Using different kernels and/or different radii, the user can achieve many new and interesting creative image effects very easily. The image calculated in this way can be used as f in a formula as with equation 2 above. The result can be the factor by which the mask M is multiplied in order to modify it.

Noise variation throughout an image is often due to variation in the properties of the surface of real world objects represented in the image. Thus, noise variation in an image can be used to improve color contrast information for the image, and the mask adjusted accordingly. For example, a noise measure version of an image can be calculated using the standard deviation. At each pixel, the standard deviation can be calculated using the following equation:

$$n = \sqrt{\Sigma(\overline{x} - x_{ij})^2} ; \qquad (6)$$

where n is the pixel value of the noise image at a given location, the sum is over the ij locations of a 3×3 or a 5×5 kernel centered at that pixel, $x_{ij}$ are the pixels sampled by the kernel, and $\overline{x}$ is the average pixel value over the kernel. Then, a noise image d can be calculated using the following equation:

$$d = \sqrt{n_x^2 + n_y^2} ; \qquad (7)$$

where $$n_x = \frac{\partial n}{\partial x}$$

and $$n_y = \frac{\partial n}{\partial y}$$

are the gradients of the noise image n. The noise image d can be normalized so it takes the maximum value of 1. And the noise image d can be used to improve color contrast information and outline edges of objects that should be taken into account, such as by multiplying the color contrast image with d, and using the result for the mask M, such as by multiplication with M.

FIG. 2 illustrates example kernels for use in adjusting an image. Two kernels 210, 220 can be used to calculate derivatives. The kernel 210 can be used to calculate a partial derivative with respect to x, and the kernel 220 can be used to calculate a partial derivative with respect to y. These kernels 210, 220 can be used to calculate gradients in the differential representation of the source image and/or to calculate the color contrast information. A kernel 230 can be used to calculate a laplacian in the differential representation of the source image. Other higher order differential representations of the source image can be calculated using a combination of the kernels 210, 220, 230 and/or other kernels.

Generating the modified image from the modified differential representation involves solving a differential equation, which will depend on the type of differential representation selected. For the differential representations of gradient, laplacian, gradient of the laplacian, and second laplacian, the equations to solve are $\Delta f = \nabla \cdot s$, $\Delta f = s$, $\Delta \Delta f = \nabla \cdot s$, and $\Delta \Delta f = s$. Solving such equations can involve iteratively applying one or more kernels. FIG. 3 illustrates example kernels 310, 320 for use in solving a differential equation. The equations with the laplacian on the left, $\Delta f = \nabla \cdot s$ and $\Delta f = s$, are the Poisson equation, and can be solved as follows. The right hand side is calculated and placed in a buffer as an image r. The kernel 310 is applied to f and r is subtracted. The result then replaces f, and this process is repeated multiple times (e.g., 100 iterations) to generate the solution. The equations with the laplacian squared on the left, $\Delta\Delta f = \nabla \cdot s$ and $\Delta\Delta f = s$, can be referred to as the Biharmonic Poisson equation. The same iterative process can be used to generate the final solution for these as well, only now using the kernel 320. When using such kernels, a boundary region can be used. The boundary region can either come from the original image, or the boundary region can be a duplication of pixels around the source image, one or more pixel widths depending on the kernels used.

Iteratively applying the one or more kernels can involve converting to a higher precision value representation and using multiresolution processing and image tiling to enhance performance. Multiresolution processing can reduce the time needed to reach convergence when iteratively solving a partial differential equation. Image tiling allows images of any size to be processed. With image tiling is used, multiresolution processing can be very useful in improving time performance.

Multiresolution processing involves generating multiple different resolutions of an image, and then successively processing each different level (from the lowest resolution to the highest resolution) passing information from one processing level down to the next until converging on a final result. At each processing level of the pyramid, the current level image can be processed using a higher precision value representation. For example, if the current level image is either an 8-bit or 16-bit image (e.g., an RGB image), a value representation greater than 16-bits can be used (e.g., a 32-bit fixed point representation, a 32-bit floating point representation, a 32-bit integer representation, etc.)

By using a higher precision value representation of pixel data values, changes in pixel values that are smaller than the usual quantum of pixel values can be handled. Negative numbers also can be handled. An optional blur can also be applied just before conversion to higher precision values in order to better preserve edges. After processing at a current level, the results can be converted back to the original value representation, and then resized by resampling down to the next level in the pyramid.

Tiling can be used when the source image, or the current level, is larger than a predefined limit. Thus, tiling can be used at each level in the pyramid. The image and mask can be broken into tiles, which can include source image padding to sample from adjacent areas, and the tiles can be processed separately. When using tiling, all the image tiles can be processed multiple times in a looping fashion, where the order of looping through the tiles changes for each loop, and the looping can be terminated based on analysis of the image (e.g., a convergence test) and/or a count of the number of times the whole image has been processed. Moreover, breaking the image into tiles and looping through the tiles may be combined such that each tile is processed as soon as it is broken out of the image (e.g., loaded into a buffer for processing). Alternatively, an algorithm can check whether padding pixels supplied by a tile to its neighboring tiles have changed, and those neighboring tiles can be added to a work list if those padding pixels have changed, which avoids having to visit all of the tiles if most of the image has already converged (taking round off issues into consideration).

For iterative processing using a kernel, application of a small kernel has a similar effect to applying a very large kernel, and thus may require a large amount of padding among tiles. By performing multiple loops through the tiles, any such need for a large amount of padding among tiles can be eliminated. Typically, only two or three loops through all the tiles is sufficient to eliminate any traces of iterative tiled processing. During subsequent loops through the tiles, various process elements may function differently to improve performance. For example, each subsequent loop through the tiles can involve a different order of looping through the tiles (e.g., a ninety degree rotation between loops: first loop is left to right and top to bottom, second loop is top to bottom and right to left, and so on, or a one hundred and eighty degree rotation between loops).

The multiresolution (or multiscale) processing described above can improve the speed with which the modified image is generated. The lower-resolution versions of the image reach stability rapidly because there are few pixels to modify. The higher-resolution versions of the image reach stability rapidly because they use the data generated on the prior level and thus start out close to the final resulting values. The iterations at lower levels of the pyramid fill in detail that can be lost in the downsampling to the next level.

Figure 4:
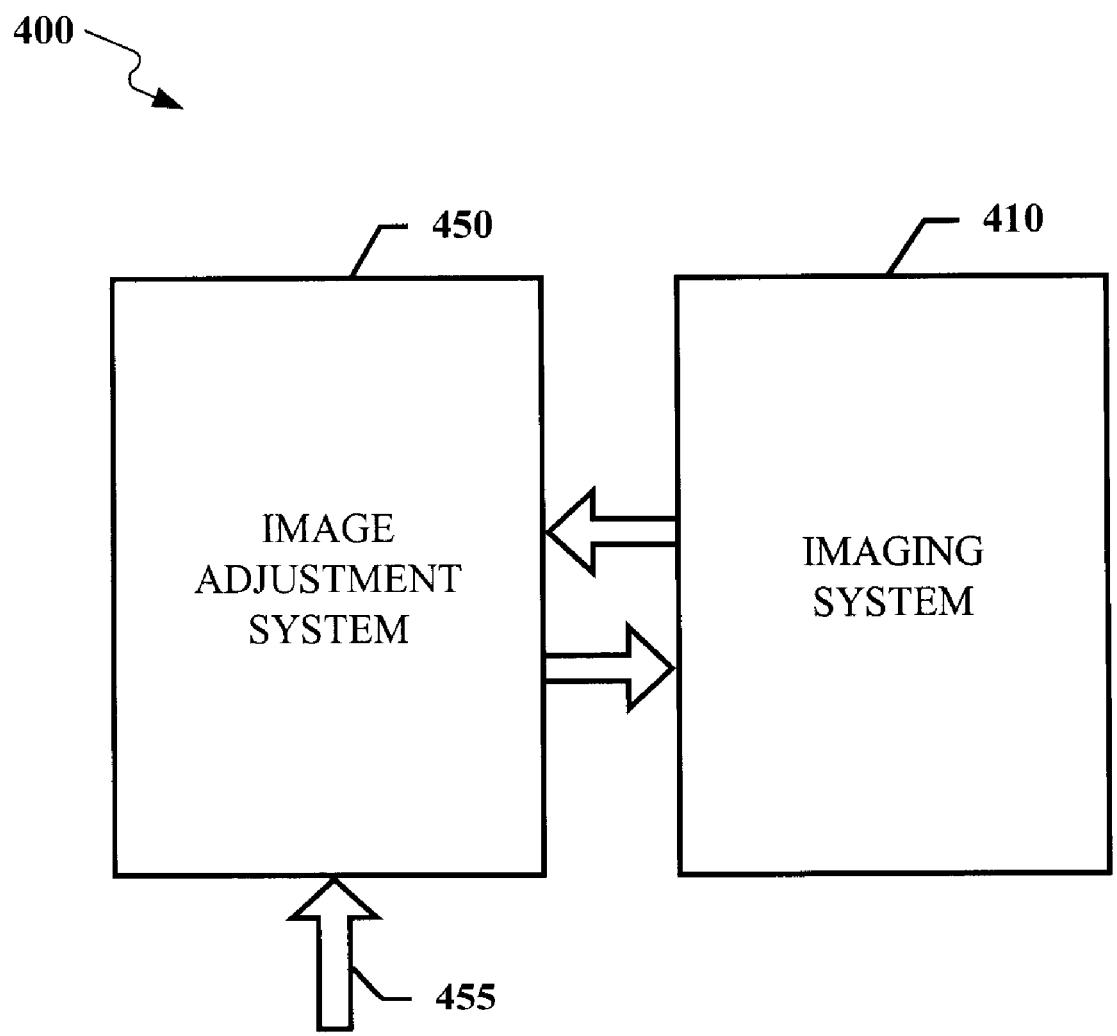
FIG. 4 is a block diagram showing an example system employing image adjustment techniques.

FIG. 4 is a block diagram showing an example system 400 employing image adjustment techniques. The system 400 can be a computer running an image processing application, such as Phtoshop® software, and can include an image generating device, such as a digital camera or scanner. The system 400 can be an image generating device itself, such as a digital camera, and can include an imaging system 410 and an image adjustment system 450. The imaging system 410 can display image data and can include a sensor array, which allows a user to capture image data. The image adjustment system 450 interacts with the imaging system 410 to modify a captured image by modifying a differential representation of the captured image based on a structural representation of the captured image and input 455 defining the adjustment. The input 455 can result in image correction or image effects, and the input 455 can be obtained using a user interface, such as that provided by image processing software, or using a simplified mechanical interface. For example, a combined roller and button can be used to select the type of change and the differential representation to be used (e.g., boost middle curvature in log space).

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the operations of the invention can be performed in a different order and still achieve desirable results.

What is claimed is:

1. A method comprising:
   receiving input defining an adjustment to be applied to a differential representation of a source image;
   calculating the differential representation of the source image;
   producing a structural representation of the source image, the structural representation corresponding to multiple types of contrast in the source image;
   modifying the differential representation based on the structural representation and the input defining the adjustment; and
   generating a modified image from the modified differential representation by solving a differential equation;
   wherein the calculating, the producing, the modifying, and the generating are performed by one or more computers.

2. The method of claim 1, wherein producing a structural representation of the source image comprises producing the structural representation of the source image based on color contrast, noise variation, and luminance variation in the source image.

3. The method of claim 2, wherein producing the structural representation based on the luminance variation in the source image comprises performing multiple blur operations.

4. The method of claim 3, wherein performing multiple blur operations comprises performing multiple blur operations using one or more kernels.

5. The method of claim 4, wherein using one or more kernels comprises selecting the one or more kernels based on one or more user-defined parameters.

6. The method of claim 2, wherein producing the structural representation based on the color contrast comprises producing the structural representation based on color contrast information derived from the source image using a structure tensor.

7. The method of claim 2, wherein producing the structural representation based on the noise variation comprises producing the structural representation based on standard deviation information derived from the source image.

8. The method of claim 2, wherein producing a structural representation further comprises building a mask capturing results of operations that generate the color contrast, the noise variation, and the luminance variation from the source image.

9. The method of claim 1, wherein calculating a differential representation comprises calculating image gradients to produce a multi-channel differential representation.

10. The method of claim 1, wherein calculating a differential representation comprises calculating at least a second order differential representation of the source image.

11. The method of claim 10, wherein generating a modified image from the modified differential representation comprises iteratively applying one or more kernels to generate a solution to the differential equation corresponding to the differential representation of the source image.

12. A system comprising:
an imaging system; and
an image adjustment system coupled with the imaging system to receive input defining an adjustment to be applied to a differential representation of a source image, calculate the differential representation of the source image, produce a structural representation of the source image, the structural representation corresponding to multiple types of contrast in the source image, modify the differential representation based on the structural representation and the input defining the adjustment and generate a modified image from the modified differential representation by solving a differential equation.

13. A computer-readable medium tangibly embodying a computer program comprising instructions operable to cause a programmable processor to perform operations comprising:
receiving input defining an adjustment to be applied to a differential representation of a source image;
calculating the differential representation of the source image;
producing a structural representation of the source image, the structural representation corresponding to multiple types of contrast in the source image;
modifying the differential representation based on the structural representation and the input defining the adjustment; and
generating a modified image from the modified differential representation by solving a differential equation.

14. The computer readable medium of claim 13, wherein producing a structural representation of the source image comprises producing the structural representation of the source image based on color contrast, noise variation, and luminance variation in the source image.

15. The computer readable medium of claim 14, wherein producing the structural representation based on the luminance variation in the source image comprises performing multiple blur operations.

16. The computer readable medium of claim 15, wherein performing multiple blur operations comprises performing multiple blur operations using one or more kernels.

17. The computer readable medium of claim 16, wherein using one or more kernels comprises selecting the one or more kernels based on one or more user-defined parameters.

18. The computer readable medium of claim 14, wherein producing the structural representation based on the color contrast comprises producing the structural representation based on color contrast information derived from the source image using a structure tensor.

19. The computer readable medium of claim 14, wherein producing the structural representation based on the noise variation comprises producing the structural representation based on standard deviation information derived from the source image.

20. The computer readable medium of claim 14, wherein producing a structural representation further comprises building a mask capturing results of operations that generate the color contrast, the noise variation, and the luminance variation from the source image.

21. The computer readable medium of claim 13, wherein calculating a differential representation comprises calculating image gradients to produce a multi-channel differential representation.

22. The computer readable medium of claim 13, wherein calculating a differential representation comprises calculating at least a second order differential representation of the source image.

23. The computer readable medium of claim 22, wherein generating a modified image from the modified differential representation comprises iteratively applying one or more kernels to generate a solution to the differential equation corresponding to the differential representation of the source image.

* * * * *